Patented Aug. 5, 1941

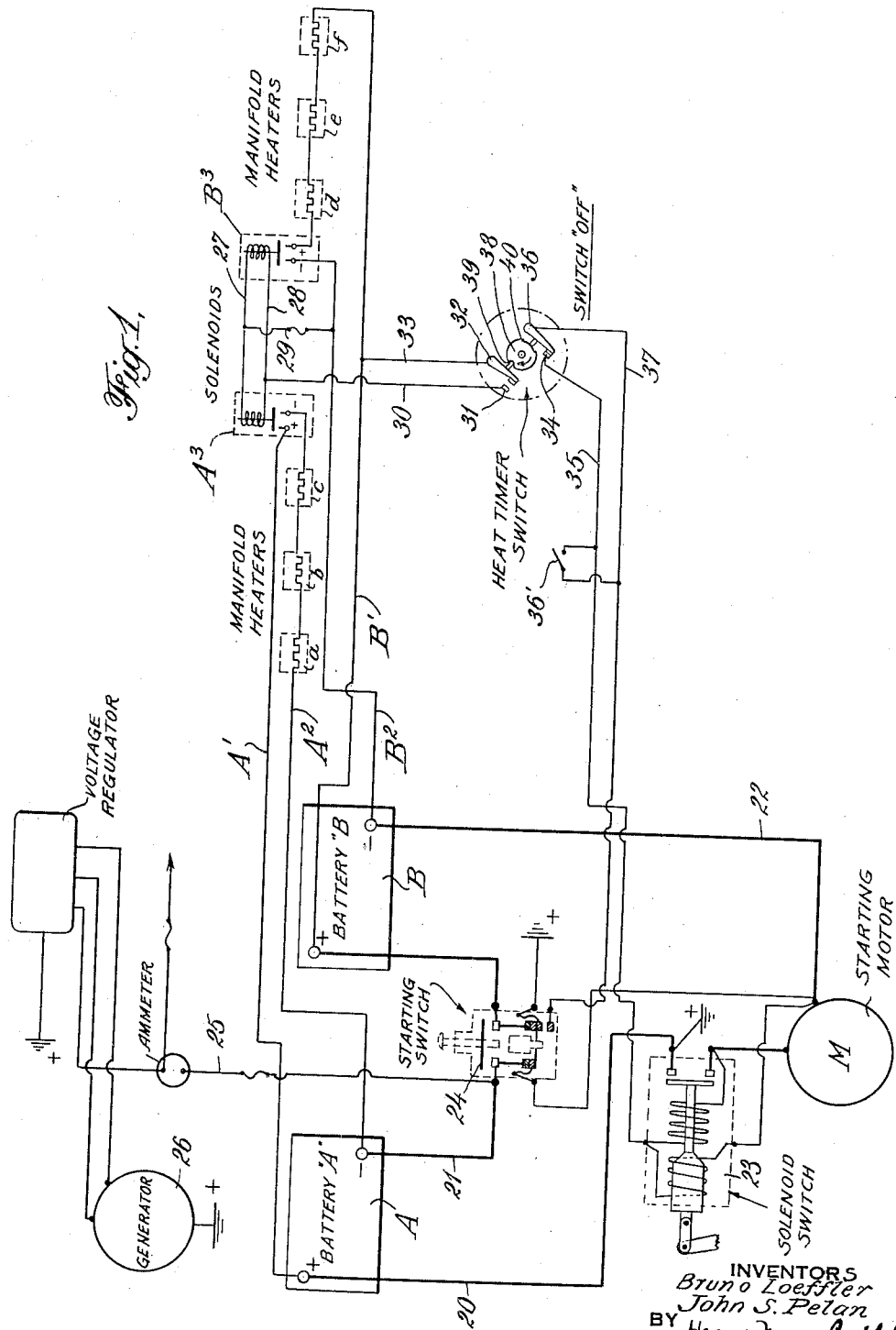

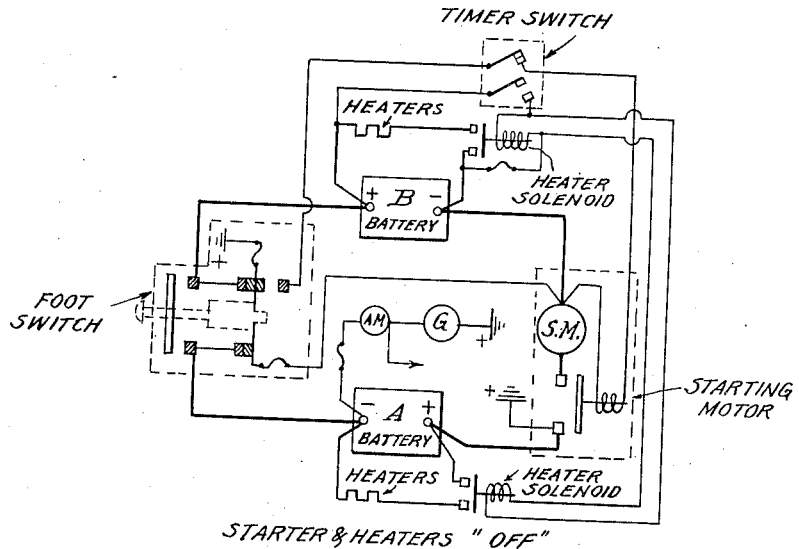
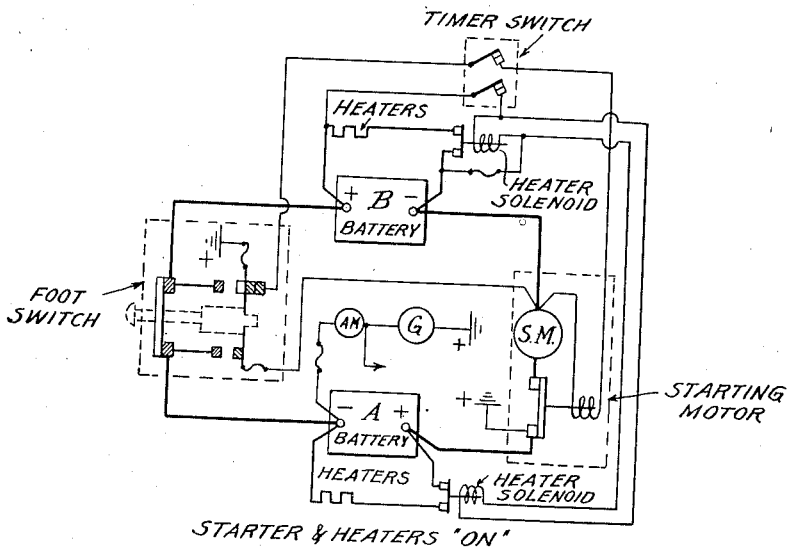

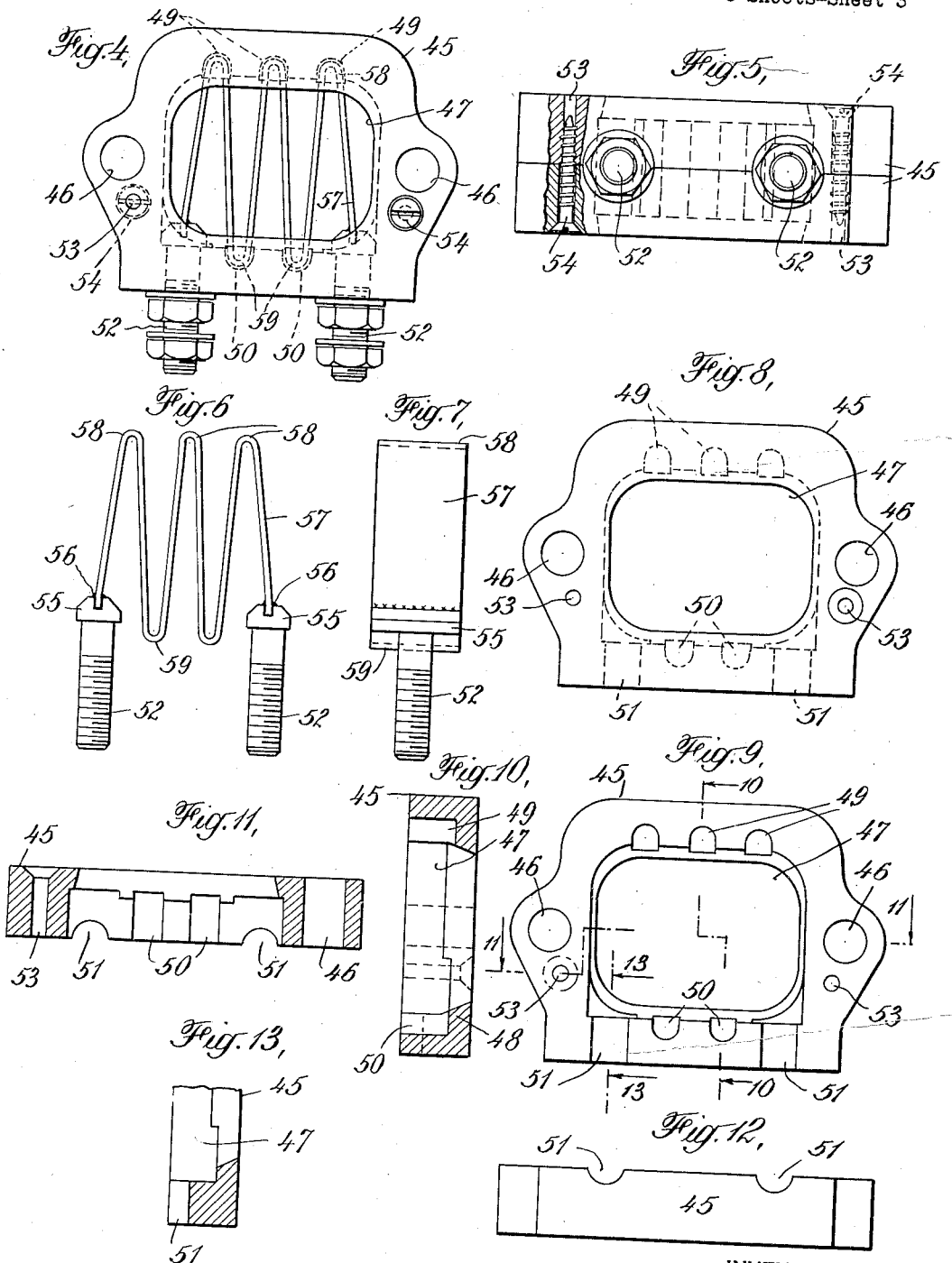

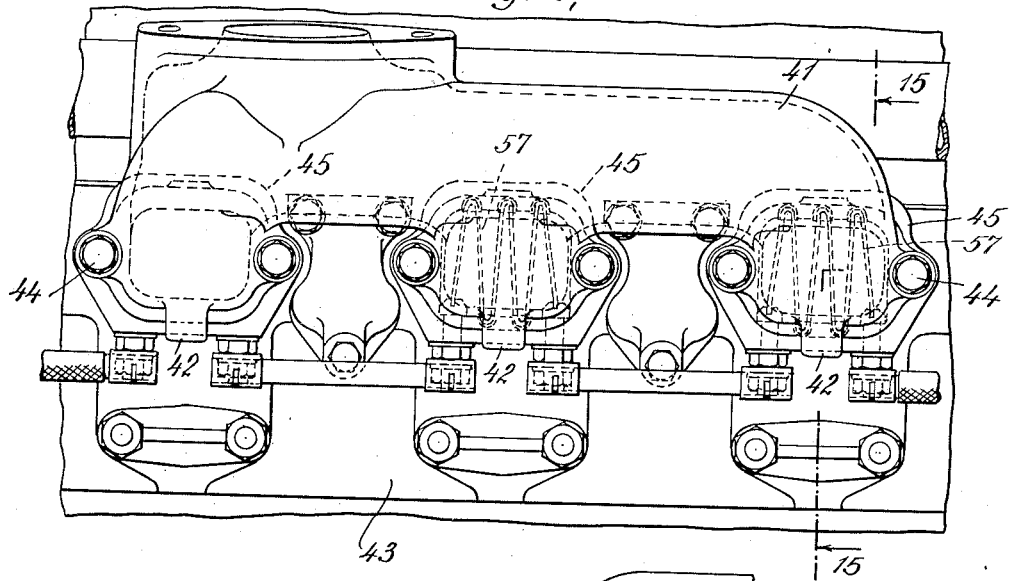
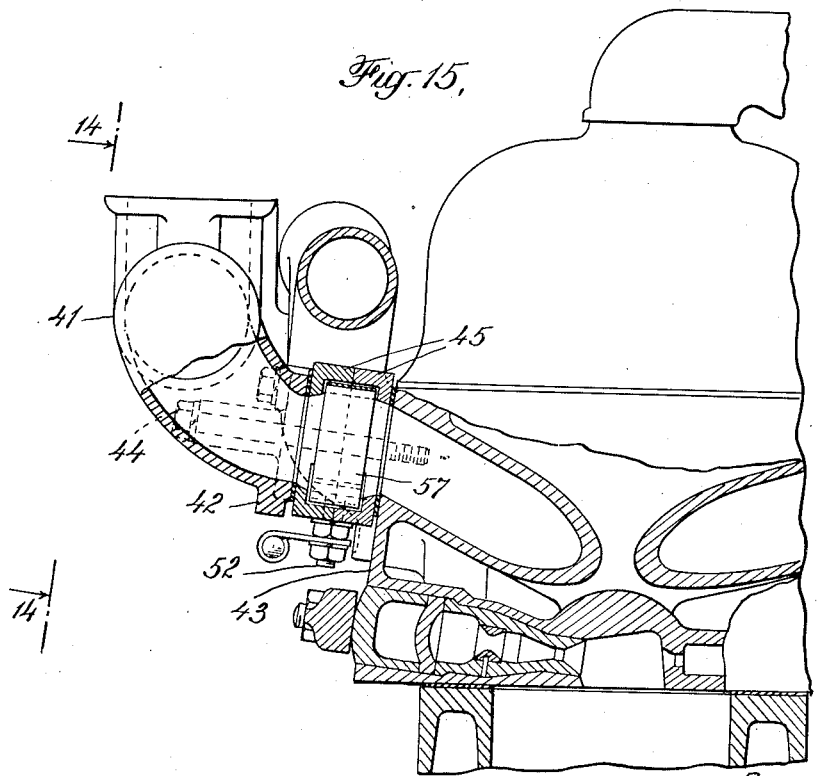

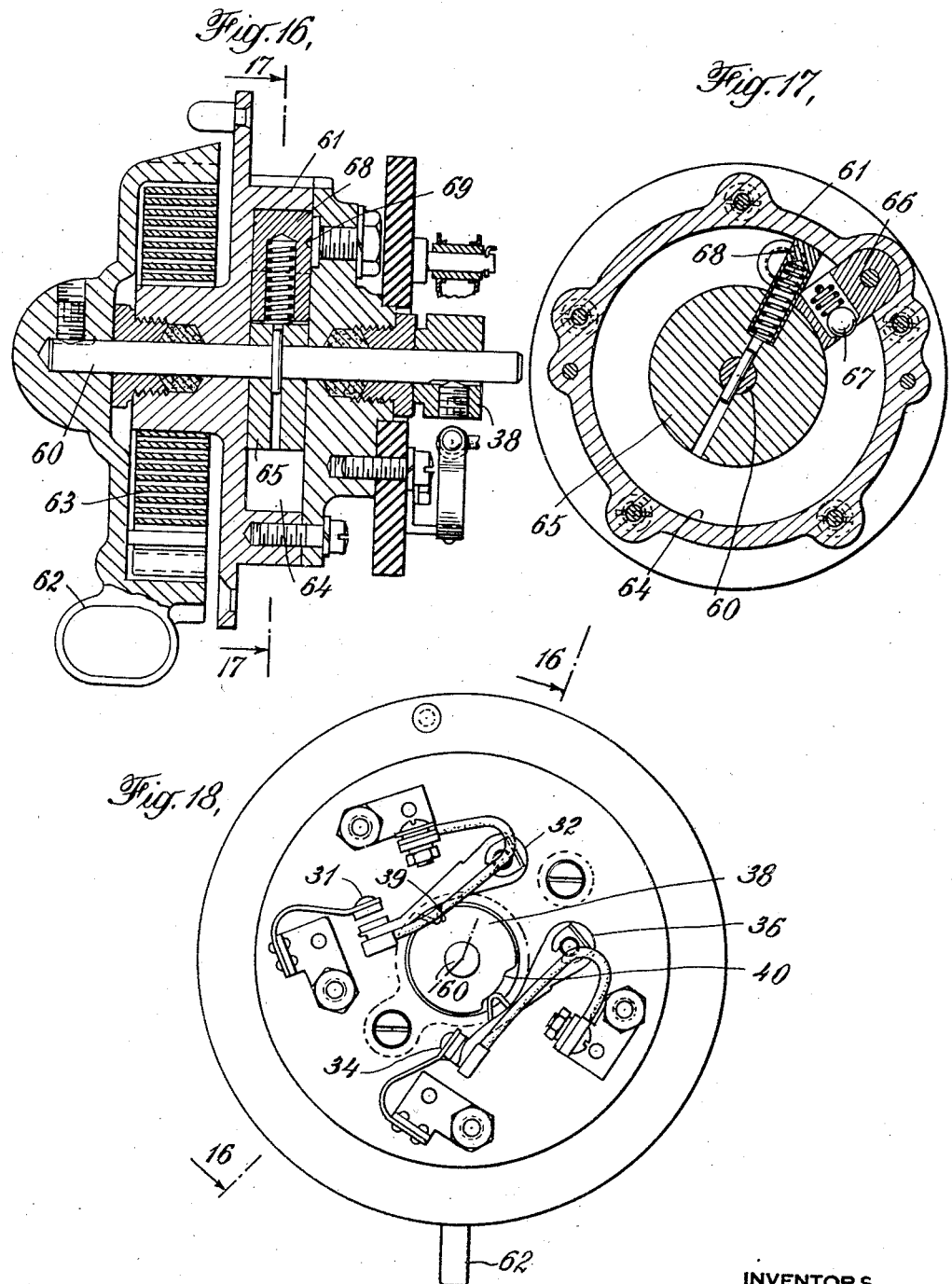

2,251,630

UNITED STATES PATENT OFFICE 2,251,630

MANIFOLD HEATER AND CONTROL CIRCUITS FOR THE SAME

Bruno Loeffler, West New York, and John S. Pelan, North Plainfield, N. J., assignors to Mack Manufacturing Corporation, Long Island City, N. Y., a corporation of Delaware Application November 22, 1939, Serial No. 305,604

7 Claims. (Cl. 290—38)

The present invention relates to electrical heater systems for manifolds of internal combustion engines and to heaters therefor, and embodies, more particularly, an improved heater circuit and heater by means of which the vehicle batteries may be relieved of uneven strain to which they have heretofore been subjected.

The invention further relates to improved heaters by means of which the fluid supplied to engine cylinders may be effectively heated.

In battery and generator circuits now in use on vehicles, the circuits are such that the lighting and manifold heater load is placed upon one battery only, where several batteries are used. Moreover, it has been necessary always to connect the heaters in circuit with the battery when the engine is started.

An object of the present invention is to provide an improved heater circuit by means of which the load is distributed evenly on the batteries used in the engine starting circuit.

A further object of the invention is to provide a circuit of the above character wherein the manifold heater circuit may be controlled in such fashion as to afford the proper heating effect for the starting conditions encountered, and without subjecting the batteries to any unnecessary load.

A further object of the invention is to provide an improved manifold heater by means of which the manifold may be effectively heated.

A further object of the invention is to provide a heater of the above character, the parts of which are simple in construction and readily manufactured and serviced.

Further objects of the invention will be apparent as it is described in further detail in connection with the accompanying drawings, wherein:

Fig. 1 is a diagrammatic view illustrating the electrical circuits and connections of a starting and heating circuit constructed in accordance with the present invention.

Fig. 2 is a view showing the essential elements of Fig. 1 with the batteries connected in parallel, the starter and heaters off, both batteries being charged, and the lighting circuit in operation.

Fig. 3 is a view similar to Fig. 2, showing the batteries in series for starting with the starter and heaters on, the lighting load on one battery and the heater solenoid load on the other battery.

Fig. 4 is a view in front elevation of a manifold heater constructed in accordance with the present invention.

Fig. 5 is a bottom view of the device shown in Fig. 4.

Fig. 6 is a view in front elevation of the heater element shown in Fig. 4.

Fig. 7 is an end view of the heater element of Fig. 6.

Fig. 8 is a view in front elevation showing one-half of the heater element insulator of the present invention.

Fig. 9 is a view in rear elevation of the insulator element shown in Fig. 8.

Fig. 10 is a view in section taken on line 10—10 of Fig. 9.

Fig. 11 is a view in section taken on line 11—11 of Fig. 9.

Fig. 12 is a bottom view of the device shown in Fig. 9.

Fig. 13 is a view in section taken on line 13—13 of Fig. 9.

Fig. 14 is a view in front elevation showing an inlet manifold with heaters installed in accordance with the present invention.

Fig. 15 is a view in section, taken on line 15—15 of Fig. 14.

Fig. 16 is a view in section taken through the axis of a time switch mechanism adapted to control the heater circuits of Figs. 1, 2 and 3.

Fig. 17 is a view in section, taken on line 17—17 of Fig. 16 and looking in the direction of the arrows.

Fig. 18 is an end view showing the contact elements of the time switch of Fig. 16.

Referring more particularly to Figs. 1, 2 and 3, there is illustrated the circuit diagrams utilized by the present invention. It will be observed that two batteries A and B are provided, being connected by wires 20, 21 and 22 to a starting motor M. A solenoid switch 23 is connected in the wire 20 and a starting switch 24 is connected in wire 21 to connect the batteries in series for starting, all in accordance with known practice. A lighting and charging circuit 25 and generator 26 are provided, also in accordance with known practice.

Manifold heaters $a$, $b$, $c$, $d$, $e$, and $f$ are connected to the batteries A and B in two circuits comprising wires $A^1$ and $A^2$ which are connected across heaters $a$, $b$ and $c$ in series, and wires $B^1$ and $B^2$ which are connected across heaters $d$, $e$ and $f$ in series.

Solenoid switches $A^3$ and $B^3$ are connected in the respective circuits $A^1$, $A^2$ and $B^1$, $B^2$ and are connected in parallel by wires 27 and 28. A wire 29 connects wire 27 to the wire $B^2$ and a wire 30 connects wire 28 to a stationary control contact 31. A movable control contact 32 is connected to the wire B¹ by means of a wire 33.

A second stationary control contact 34 is connected by a wire 35 to the solenoid switch 23 while a second movable contact 36 is connected to the starting switch 24 by a wire 37.

Figs. 2 and 3 illustrate the connections above described for running with charging and lighting from both batteries, and starting and heating, respectively. These operations are controlled by a cam 38 having recesses 39 and 40. The manner in which this cam is operated will be described in greater detail hereinafter.

The heaters a, b, c, d, e and f are mounted in intake manifolds as illustrated in Figs. 14 and 15 wherein a manifold 41 is shown as provided with three ports, each of which is provided with a flange 42. Each cylinder head 43 receives bolts 44.

Between the flanges 42 and cylinder heads 43 are mounted heaters shown in detail in Figs. 4-13. These heaters are formed of cooperating insulator elements 45 having apertures 46 adapted to receive the bolts 44. The insulator elements are formed with inner openings 47 adapted to register with the manifold openings and having a flange 48. Recesses 49 and 50 are formed in the top and bottom of the insulator respectively and are in staggered relationship as illustrated in Fig. 9. Recesses 51 are provided to receive heater posts 52 (Figs. 6 and 7) and holes 53 are provided to receive screws 54 by means of which the elements may be secured in assembled position.

The posts 52 are formed with T heads 55 having slots 56 within which the ends of a heater element 57 are received and secured as by brazing. The element 57 is formed with upper bends 58 and lower bends 59 to engage the respective recesses 49 and 50, thus insuring effective positioning of the element 57 at all times, as shown in Fig. 4.

In order to actuate the cam 38, a timing mechanism is provided as illustrated in Figs. 16, 17 and 18. This mechanism includes a shaft 60 upon which the cam 38 is secured. The shaft extends through a casing 61 and, at the other end thereof, has a manually operated handle 62 secured thereto. A coil spring 63 secured to the handle 62 and casing 61 normally urges the handle into a normal position.

Within the casing 61, there is provided a chamber 64 within which a disc 65 fits to provide an annular space receiving oil or other suitable fluid. A plug 66 provided with a ball check valve 67 is provided in the chamber 64 and the disc 65 carries a vane 68 having a metering hole or aperture 69 formed therein.

When the engine is to be started, the handle 62 is moved to rotate the vane 68 and cam 38 to the left as viewed in Fig. 17. The oil flows through the check valve 67 easily and the heater contact 32 is closed while the starting contact 36 is opened to prevent a needless strain on the battery. Depending upon the distance the handle 62 is turned, viscosity, temperature, etc., there will be a time interval during which the heater circuits will be closed before the starting motor circuit is closed by the return of the cam 38 to normal position, permitting the contact 36 to be closed.

As shown in Fig. 1, an auxiliary manually operated switch 36′ may be provided to supplant the switch 36 if desired.

It will be observed that the insulator elements are all identical and can thus be used interchangeably. The parts of the heater are all simple and inexpensive to manufacture. The heating surface is great with a minimum of restrictions to ingoing air. There are no parts that can shake loose and get into the combustion chamber, and a further advantage is the location close to the cylinder head to avoid loss of heat as the air travels to the cylinder.

The pockets in the insulators and the formation of the heater element are such that the heater element is maintained effectively in position and, if the element does break, it will not fall against a grounded element to cause a short circuit.

Moreover, the present invention provides a well balanced electrical system in which all batteries share the load about equally. The circuits are such as to insure effective manifold heating, but only to the extent required. Moreover, until the manifold has been heated adequately, the starting motor cannot be operated, thus saving unnecessary strain on the batteries under certain conditions.

We claim:

1. In combination with a vehicle starting motor, a battery, a starting motor switch and circuits connecting the same for operation, of a manifold heater, a circuit connecting the heater to the battery, a switch in the last named circuit for opening and closing the heater circuit, and means rendered operable by the closing of the switch for maintaining the switch in a closed position for a predetermined period of time only.

2. In combination with a vehicle starting motor, a battery, a starting motor switch and circuits connecting the same for operation, of a manifold heater, a circuit connecting the heater to the battery, a switch in the last-named circuit for opening and closing the heater circuit, means rendered operable by the closing of the switch for maintaining the switch in closed position for a predetermined period of time only, and means to prevent the energization of the starting motor by the starting motor circuit when said switch is in a closed position.

3. In combination with a vehicle starting motor, a battery, a starting motor switch and circuits connecting the same for operation, of a manifold heater, a circuit connecting the heater to the battery, means to prevent the energization of the starting motor by the starting motor circuit, a switch in the said circuit normally maintained in an open position which opens the heater circuit, means to close the switch for a predetermined period of time, and common means to actuate the two last named means.

4. In combination with a vehicle starting motor, a plurality of batteries, a starting motor switch, a lighting circuit connected to one of the batteries, and circuits connecting the starting motor and batteries for starting and running operations, of a manifold heater, a circuit connecting the heater to the other of said batteries, and a switch in the last named circuit adapted to close the heater circuit for a limited time only.

5. In combination with a vehicle starting motor, a plurality of batteries, a starting motor switch, a lighting circuit connected to one of the batteries, and circuits connecting the starting motor and batteries for starting and running operations, of a plurality of manifold heaters, solenoid switches and circuits for connecting the heaters to the other of said batteries, a solenoid circuit including the other of the said batteries, and a switch in the solenoid circuit adapted to close the same for a limited time only.

6. In combination with a vehicle starting motor, a plurality of batteries, a starting motor switch, a lighting circuit connected to one of the batteries, and circuits connecting the starting motor and batteries for starting and running operations, of a plurality of manifold heaters, solenoid switches and circuits for connecting the heaters to the other of said batteries, a solenoid circuit including the other of said batteries, a switch in the solenoid circuit adapted to close the same for a limited time only, and means to disconnect the starting motor circuit until after the solenoid circuit has been closed for a predetermined time.

7. In combination with a vehicle starting motor, a plurality of batteries, a starting motor switch, a lighting circuit connected to one of the batteries, and circuits connecting the starting motor and batteries for starting and running operations, of a plurality of manifold heaters, solenoid switches and circuits for connecting the heaters to the other of said batteries, a solenoid circuit including the other of the said batteries, a switch in the solenoid circuit adapted to close the same for a limited time only, and means actuated by means common to the solenoid switch to disconnect the starting motor circuit until after the solenoid circuit has been closed for a predetermined time.

BRUNO LOEFFLER.
JOHN S. PELAN.